Samuel C. Collins
INVENTOR.

BY [signature]

Attorney

Samuel C. Collins
INVENTOR.

BY [signature]

Attorney

Samuel C. Collins
INVENTOR.

BY [signature]
Attorney

Samuel C. Collins
*INVENTOR.*

BY *[signature]*

Attorney

Samuel C. Collins
*INVENTOR.*

BY [signature]

Attorney

Samuel C. Collins
INVENTOR.

BY Bernie G. Lopper

Attorney

Samuel C. Collins
*INVENTOR.*

BY Bernie G. Lyon

Attorney

Samuel C. Collins
INVENTOR.

BY

Attorney

Samuel C. Collins
INVENTOR.

BY [signature]

Attorney

United States Patent Office 3,438,220

Patented Apr. 15, 1969

3,438,220

EXPANSION ENGINE FOR CRYOGENIC REFRIGERATORS AND LIQUEFIERS AND APPARATUS EMBODYING THE SAME

Samuel C. Collins, Belmont, Mass., assignor, by mesne assignments, to 500 Incorporated, Cambridge, Mass., a corporation of Delaware Filed Nov. 14, 1966, Ser. No. 593,852
Int. Cl. F25d 9/00
U.S. Cl. 23—285 16 Claims This invention relates to cryogenic apparatus, and more particularly to expansion engines for cryogenic refrigerators and liquefiers employing helium as a fluid.

There are available a number of different types of apparatus for providing cryogenic refrigeration and for liquefying cryogenic gases, including helium. All such apparatus incorporate the expansion of high-pressure fluids in their operation. These apparatus operate on one of several cycles, and they are designed to meet certain specific needs. For example, there are refrigerators and liquefiers which can be made in very small sizes for use with such devices as infrared detectors, paramagnetic amplifiers and the like. There are also refrigerators and liquefiers designed particularly for space applications, and these must exhibit a very high degree of reliability and be able to operate with a minimum of friction-generating surfaces. A third class may be described as essentially stationary, high-capacity units which are typically installed in laboratories or in plants to produce continuously large quantities of liquid helium or supply relatively heavy cryogenic refrigeration loads for extended periods. The expansion engines of this invention are particularly well suited for incorporation in this last type of refrigerator-liquefier apparatus.

So-called helium cryostats suitable for producing liquid helium or furnishing cryogenic refrigeration are now well known. The apparatus and cycle described in my U.S. Patent No. 2,458,894 has been widely accepted and extensively used throughout the world. The apparatus embodying this cycle has proven to be reliable, but its maintenance requires a highly-skilled technician and is time consuming. The expansion engines used in the present cryostats, which are the subject of U.S. Patent 2,607,322, are located totally within the cryostat housing; and since the cycle requires that they be constantly exposed to a cold atmosphere, they must be capable of operating without lubrication. This, in turn, requires periodic maintenance. To accomplish this maintenance it is necessary to disassemble most of that portion of the apparatus which lies within the cavity defined by the main or first heat exchanger. This means breaking seals, disrupting alignments and removing a large number of the components from the cryostat. Although this has been done successfully for many cryostats constructed in accordance with the teaching of U.S. Patent 2,458,894, and U.S. Patent 2,607,322, it would be desirable to have a cryogenic apparatus, capable of delivering either refrigeration or liquefying helium, which was of a simple construction and had expansion engines which could be readily withdrawn. Preferably, the withdrawal of the expansion engines should be possible without breaking the hermetical seal of the apparatus and without disturbing any of the heat exchange components, adsorption units and other components making up the cryostat. Such withdrawal and reinsertion of the expansion engines should also not present any alignment problems.

The invention described herein may be briefly described as a cryogenic apparatus having unique expansion engines in combination with a heat exchanger system adapted to effect out-of-contact or indirect heat exchange between fluid streams of high and low pressure; a fluid flow path including conduits adapted to conduct high-pressure and low-pressure fluid through the heat exchange system; and a hermetically-sealed housing containing the heat exchange system, the fluid flow path and the fluid expansion engines. There are also the necessary external conduits for introducing high-pressure fluid into and withdrawing low-pressure fluid from the system, as well as a liquid draw-off line or suitable fluid communication with an external Joule-Thomson valve. The fluid expansion engines are constructed so that they may be withdrawn from the apparatus without breaking the hermetic seal within the housing. Each expansion engine comprises a piston cylinder which extends externally of the housing and which has a piston movable within it to define an expansible volume. The control of the flow of high-pressure fluid into and low-pressure fluid from the expansible volume is achieved through valves which have rods extending externally of the housing. These rods, as well as the piston rod, are equipped with a unique sealing arrangement which makes possible the use of lubrication at room temperatures as well as the rapid withdrawal of the valves and pistons and their reinsertion without any particular attention to alignment.

It is therefore a primary object of this invention to provide a cryogenic apparatus which may be used either as a source of cryogenic refrigeration or as a cryogenic liquefier, the apparatus being further characterized as having one or more unique expansion engines. It is another object of this invention to provide an apparatus of the character described wherein the expansion engines are lubricated entirely outside the housing at atmospheric temperatures and so designed that the lubricant does not reach into the lower temperature regions where it would solidify and freeze. It is another object of this invention to provide apparatus of the character described wherein the expansion engines may be easily and quickly withdrawn while retaining all of the other components properly aligned within a housing which remains hermetically sealed. It is another object of this invention to provide apparatus capable of continuously producing liquid helium at a relatively rapid rate, or of delivering cryogenic refrigeration to a relatively large load. Other objects of the invention will in part be obvious and will in part be apparent hereinafter.

The invention accordingly comprises the features of construction, combinations of elements, and arrangement of parts which will be exemplified in the constructions hereinafter set forth; and the scope of the invention will be indicated in the claims.

For a fuller understanding of the nature and objects of the invention, reference should be had to the following detailed description taken in connection with the accompanying drawings in which.

Figure 1:
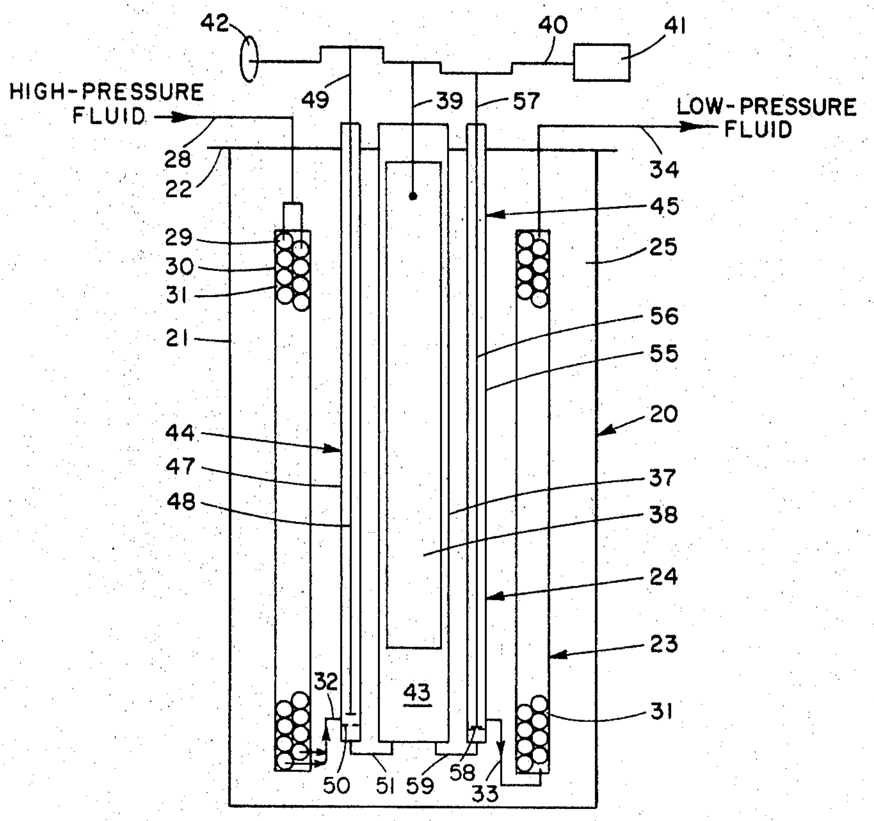
FIG. 1 is a simplified outline drawing of a refrigerator embodying an expansion engine of this invention.

As will be apparent in the brief discussion of FIGS. 11–15, the expansion engines of this invention may be incorporated in a number of different apparatus embodying several different cycles. In order generally to illustrate the use of an expansion engine of this invention in a cryogenic apparatus, FIG. 1 is presented in somewhat simplified form. This will lead to an understanding of the manner in which the expansion engine works and how it is incorporated in refrigerators and liquefiers. It will also illustrate the relationship of the various essential components in a refrigerator or liquefier.

In FIG. 1 there is shown one of the simplest forms of a cryogenic refrigerator. The refrigerator is indicated by numeral 20. It will be seen to consist of a fluid-tight housing 21 equipped with a cover member 22 so attached thereto as to define within the housing a hermetically sealed insulated chamber 25 which may or may not be evacuated. Within this housing is an out-of-contact heat exchanger 23 and the expansion engine 43 in which the high-pressure fluid, initially cooled in the main heat exchanger, is further cooled by expansion.

A high-pressure fluid, e.g., helium, is introduced through a suitable conduit 28 which is in fluid communication with high-pressure tubing 29 of heat exchanger 23. The tubing is contained within a suitable annular housing 30. The volume 31 defined between the high-pressure tubing 29 and the internal walls of heat exchanger housing 30 form the low-pressure side 31 of the heat exchanger. As the high-pressure fluid travels downwardly through high-pressure tubing 29, it is cooled by out-of-contact heat exchange with low-pressure cold fluid passing upwardly through the low-pressure side 31. In the very simple apparatus of FIG. 1 the high-pressure initially cooled fluid is withdrawn from the high-pressure tubing 29 at the bottom of the heat exchanger and by means of high-pressure conduit 32 led through the high-pressure inlet valve 44 into expansion chamber 43. In like manner, low-pressure conduit 33 provides the low-pressure fluid discharge path from the chamber 43 into the low-pressure side of the heat exchanger. The expansion and final cooling of the fluid is performed within the expansion engine 43 which comprises a piston cylinder 37 extending externally of the housing, and a piston 38 which moves reciprocally within the cylinder as it is driven by a piston rod 39. The rod itself is connected to a crankshaft 40, and it drives a dynamometer 41 which serves as an energy absorption means. A flywheel 42 may be provided to serve as a speed regulation means. The piston 38 in its up and down movement defines within the cylinder 37 and expansible volume (expansion chamber) 43 in which the fluid expansion and hence the final cooling of the fluid takes place. Inlet valve assembly 44 and exhaust valve assembly 45 complete the expansion engine.

The inlet valve assembly 44 is comprised of a valve cylinder 47 in which a valve stem 48 reciprocates. This valve stem terminates in a rod 49 which extends externally of the housing and which is mechanically attached to the crankshaft 40. The valve works to open and close an aperture in a valve seat 50 and hence controls the passage of high-pressure fluid from a high-pressure tubing 29 through conduit 32 into expansion chamber 43 by way of a conduit 51.

The exhaust valve assembly 45 is identical in design, comprising an exhaust valve cylinder 55, a valve stem

56, having a rod 57 which is also mechanically attached to the crankshaft 40. By opening and closing the port in valve seat 58 the discharge of low-pressure fluid from the expansion chamber 43 is accomplished by way of conduit 59, exhaust valve 45 and conduit 33 into the low-pressure side 31 of the heat exchanger 23.

Figure 2:
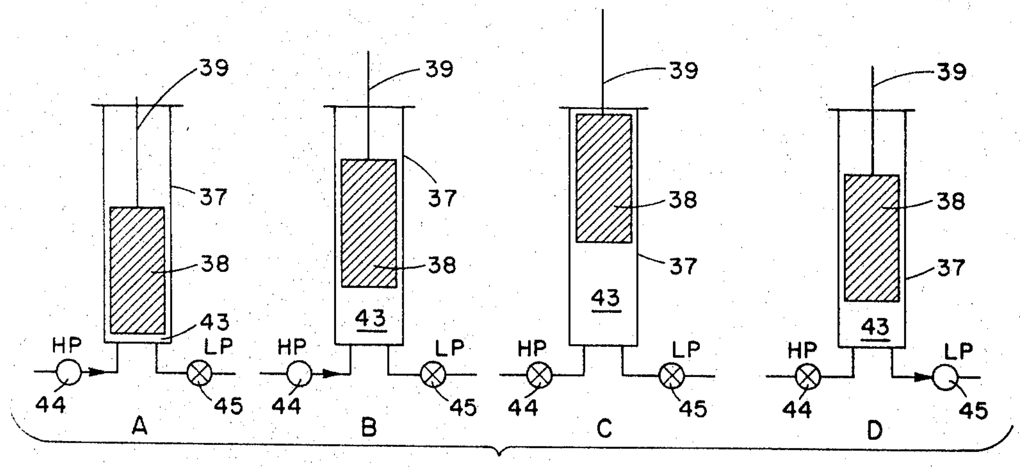
FIG. 2 is a diagrammatic representation of the cycle performed by the expansion engine.

The development of refrigeration in the expansion engine is illustrated in FIG. 2. The cycle performed by the expansion engine is one which is commonly used and hence is not a part of the invention. However, a very brief description is believed to be helpful in understanding this invention. In FIG. 2 like reference numerals refer to like components in FIG. 1. However, for simplicity the inlet and exhaust valves have been replaced by circles, and an X in a circle indicates that the particular valve is closed. Assume to begin the cycle that the piston 38 is in its bottom dead center position. The high-pressure valve is opened permitting initially cooled high-pressure fluid to be delivered from the main heat exchanger into chamber 43. Piston 38 is moved upwardly, permitting an additional quantity of high-pressure fluid to enter, until it has reached approximately twenty-five percent of its maximum volume. At this point, the high pressure valve is closed, the low-pressure valve remains closed and the piston 38 is brought to its top dead center position maximizing the volume of chamber 43, expanding the high-pressure fluid therein and further cooling it through expansion. Then the low-pressure valve is opened and the low-pressure cold fluid exhausts from chamber 43 as the piston 38 is moved downwardly to begin another cycle.

Figure 3:
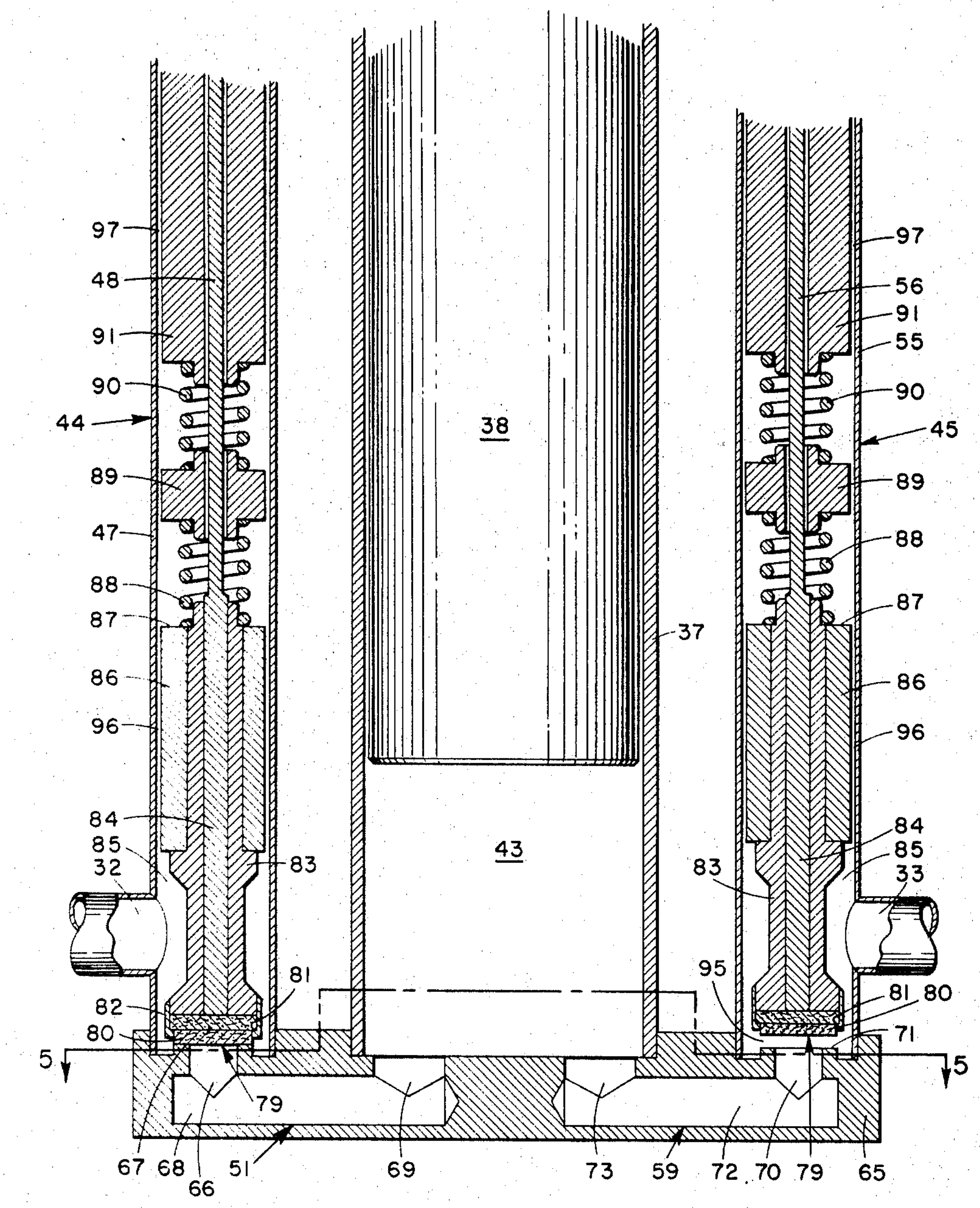
FIGS. 3 and 4 are detailed cross sections of the lower and upper halves, respectively, of the expansion engine of this invention.
Figure 4:
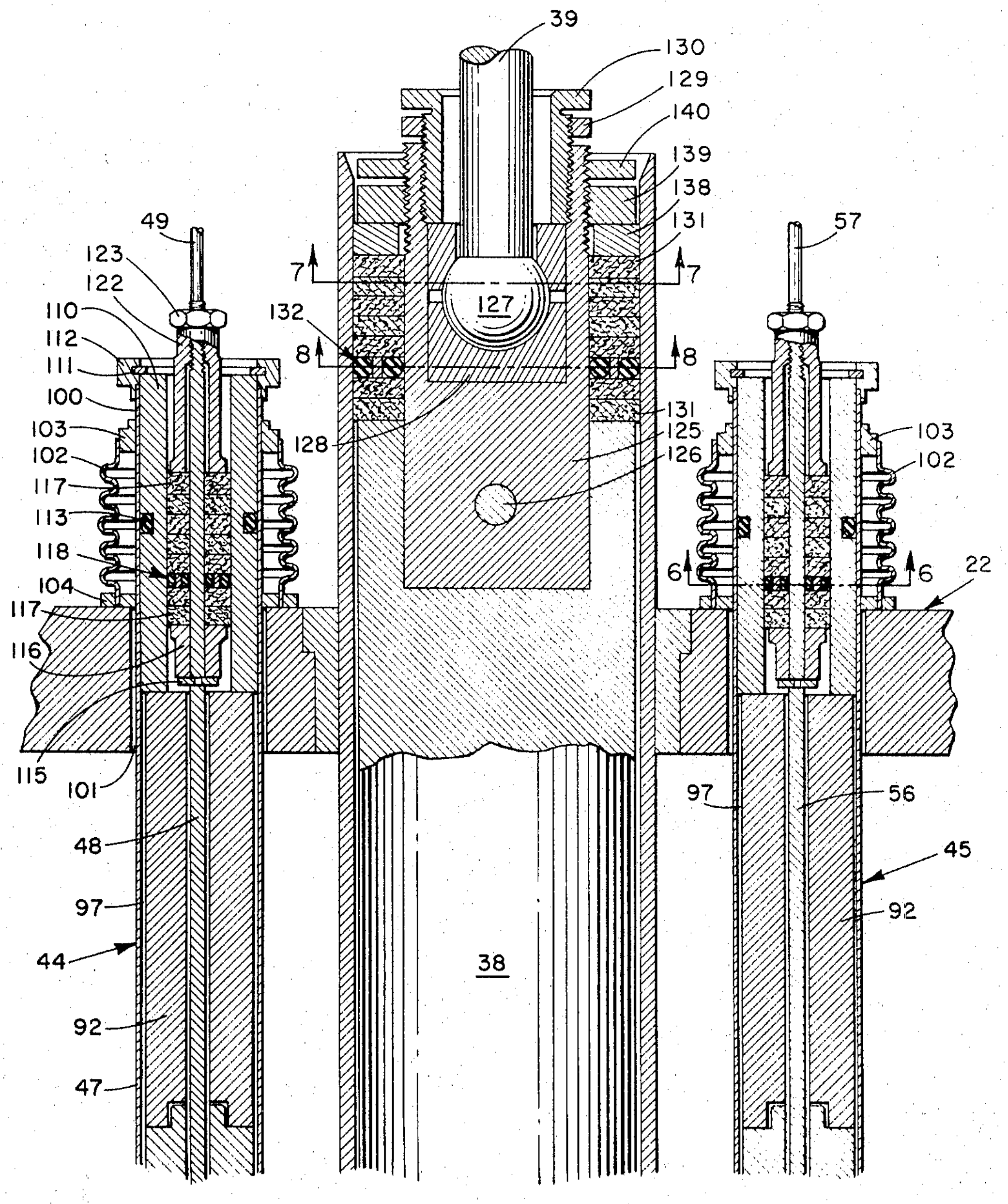
Figure 5:
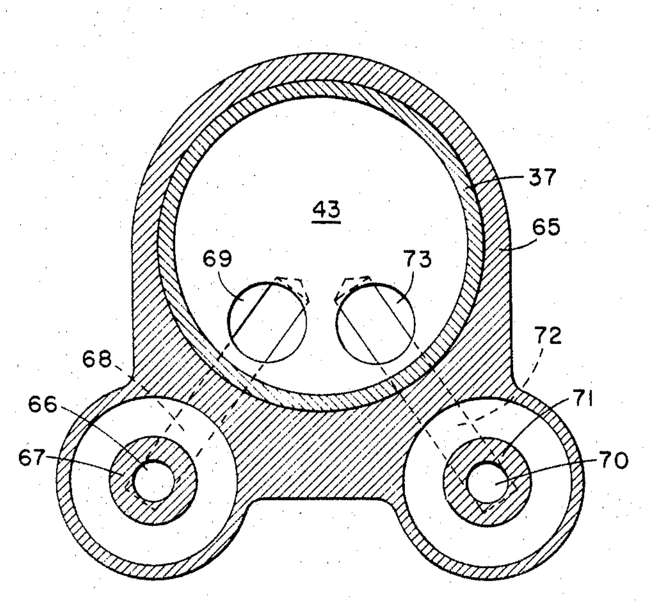
FIG. 5 is a cross section taken along line 5—5 of FIG. 3 through the valve plate.
Figure 6:
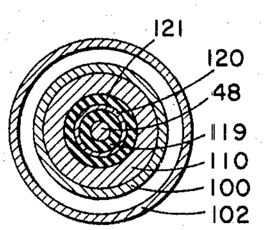
FIG. 6 is a cross section taken along line 6—6 of FIG. 4 through the sealing means of one of the valve assemblies.
Figure 7:
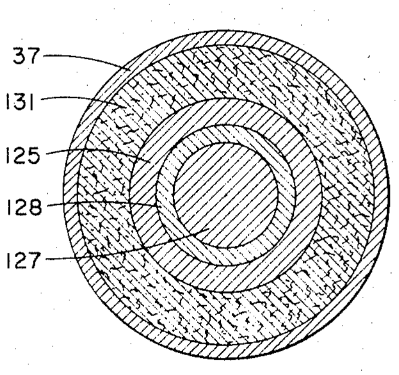
FIG. 7 is a cross section taken along line 7—7 of FIG. 4 illustrating one portion of the piston sealing assembly.

FIGS. 3 and 4 in combination represent a detailed cross-sectional drawing of the expansion engine of this invention. In discussing these drawings, reference should also be had to FIGS. 5–8, which are cross sections through the engines at four different points. In order better to illustrate the two valves in FIGS. 3 and 4, they have been rotated out of their true alignment which is shown in FIG. 5. Thus, FIGS. 3 and 4 show the valves positioned 180° from each other when, in fact, as will be seen in FIG. 5, the angle between them approximates 40°. In FIGS. 3 and 4 like reference numerals refer to like elements shown in FIG. 1.

Beginning with FIG. 3, which illustrates the lower half of the engine, it will be seen that the piston cylinder 37 and the two valve cylinders 47 and 55 terminate in a valve plate 65 (see also FIG. 5). The high-pressure conduit 51, which provides the necessary fluid communication between the inlet valve 44 and the expansion chamber 43, will be seen to be made up of a vertical section 66 which terminates in a valve seat 67 within the valve cylinder 47, a horizontal section 68 and a second vertical section 69 which communicates directly with expansion chamber 43. In a similar manner, low-pressure conduit 59, which provides the fluid communication between the exhaust valve 45 and the expansion chamber 43 is made up of a vertical section 70 which terminates in a valve seat 71 within the valve cylinder, a horizontal section 72, and a second vertical section 73 opening directly into the expansion chamber 43. The two valves are identical in their structure, operation and function; and it will therefore only be necessary to describe one of these in detail. Identical numbers are given to identical parts in FIGS. 3 and 4 for the two valves.

The valve operates by closing off the fluid communication between high-pressure fluid line 32 (or low-pressure fluid line 33) and conduit 51 (or conduit 59). This is done by causing a closing member 79 to contact valve seat 67 with sufficient force to seal off any gas flow. The closing member 79 is seen in this embodiment to be made up of a leather disk 80 having a shoulder 81 which is held by means of a ring 82 to a shaped sleeve 83 which surrounds a lower portion 84 of the valve stem 48. Although this closing member 79 may be made of a resilient material such as leather, this is not necessary. It is, however, possible to use other nonmetallic materials such as Micarta, polytetrafluoroethylene, nylon or other plastic materials suitable for low-temperature applications.

There is defined between the sleeve 83 and the internal wall of valve cylinder 47 a fluid passage 85 into which high-pressure, initially cooled fluid is delivered from the heat exchanger by way of conduit 32. Around sleeve 83 there is affixed a nonmetallic valve guide 86 which makes a loose fit with the inner wall of cylinder 47. The sleeve 83 and valve guide 86 form in combination a shoulder 87 which serves to support a first or lower spring 88. The upper portion of the spring is held in position by means of a spring spacer 89 which also serves as the bottom support member for a second or upper spring 90. This upper spring is, in turn, held in position by a first valve spacer 91. Reference to FIG. 4 will show that there is a second valve spacer 92 which sits on the lower valve spacer 91. These are made in sections for convenience of fabricating and introducing into the cylinder. In one preferred embodiment the sleeve 83 is stainless steel; and spring spacer 89, valve guide 86, and the two valve spacers 91 and 92 are formed of a material, such as Micarta, which has a very low heat conductivity and a very low coefficient of thermal expansion. As will be seen in the case of the exhaust valve 45, which is shown open, the raising of the valve rod defines a spacing 95 between the resilient members 79 and the valve seat thus opening the fluid path from the expansion chamber into the heat exchanger. The annular spacing 96 between the valve guide 86 and the valve cylinder is of a magnitude to make a relative free fit, e.g., of the order of 0.001 to 0.002 inch; while the annular spacing 97 between the spacers and the cylinder is such as to obtain an even freer or looser fit, e.g., of the order of about 0.005 inch.

The upper end of the valve cylinder 47 (FIG. 4) serves as a packing housing 100 for the sealing assembly for the valve. The valve cylinder 47 and its integral extension 100 extend from within the hermetically-sealed housing through a suitable opening 101 in cover member 22 to the atmosphere. The fit of the cylindrical housing in this hole is relatively loose since it is necessary to permit the valve cylinder and the integral packing housing readily to slip up and down through the opening. This is necessary because of the contraction experienced by the lower portion of valve cylinder 47 as it cools down to its normal operating temperature. In order to provide a fluid seal and flexibility of movement for the valve cylinder, the joining and seal is accomplished through bellows 102, which is permanently fixed in fluid-tight relationship with the upper end of packing housing 100 through a sealing member 103 and to the cover member 22, through a sealing member 104. It will be seen from an examination of FIGS. 3 and 4 that the interiors of the piston cylinder and of the valve cylinders are completely isolated from the hermetically-sealed volume 25 defined within the housing 21.

Within the packing housing 100 is an annular packing cylinder 110 which rests on the second or upper valve spacer 92 and is held in a fixed position by a snap ring 111 which slips into a holding lip 112 attached to the top of the packing housing 100. A close fit is maintained between the annular packing cylinder 110 and the internal wall of housing 100, and fluid sealing is accomplished through the use of an elastomeric O-ring 113. By means of a retaining ring 115 a gland seat 116 is affixed to the upper end of the valve rod 48. This gland seat serves as a support on which are positioned a series of washers 117 and a sealing ring assembly generally designated by the numeral 118. The washers 117 are conveniently made of leather, but they may also be made from such other nonmetallic materials as polytetrafluoroethylene, nylon and other synthetic resins. The sealing ring assembly is shown in cross section in FIG. 6. It will be seen to be comprised of an inner elastomeric O-ring 119, a metal annular ring 120 and an outer elastomeric O-ring 121. This arrangement for the sealing ring assembly 118 is particularly advantageous since it permits the O-rings to function efficiently as seals and at the same time prevents them from being forced out of shape or doubled over in the movement of the valve rod. Gland bushing 122 and nut 123 retain the sealing assembly in position.

The only lubrication required in the entire valve assembly is in the seal comprising the series of washers 117 and the sealing ring assembly 118. If the washers are made of leather, they may be impregnated with a small quantity of a lubricant (liquid or solid). In this manner, the surface wear between the leather washers and the internal wall of the annular packing cylinder 100 is minimized. Moreover, it will be seen that this small quantity of lubricant is always maintained at ambient temperatures. It has been found that even after two thousand hours of operation no difficulties were encountered using these seals, and no maintenance was required. If the washers are formed of polytetrafluoroethylene, it may be desirable to impregnate the surface with a suitable solid lubricant as is well known in the art.

Figure 8:
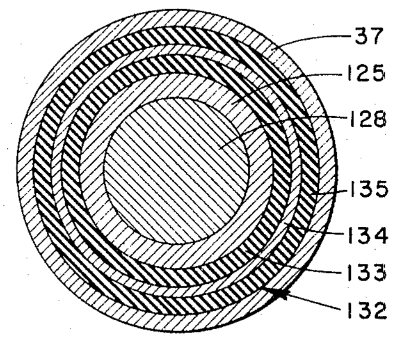
FIG. 8 is a cross section taken along line 8—8 of FIG. 4 showing another portion of the piston sealing assembly.

The sealing of the piston 38 is similar to that used for the valve assemblies. As will be seen in FIG. 4, piston 38 has inserted in its upper end a ball-joint housing 125 which is held in place by means of a dowel pin 126. The ball joint 127 is positioned within a ball-joint race 128 formed of two sections, as is well known in the art. This assembly is maintained in position through the use of a piston packing bushing 130 and nut 129. Between that position of the ball-joint housing which extends above the piston and the inner wall of the piston cylinder 37 is an annular space which is occupied by the sealing means which comprises a series of washers 131 which may be of leather or any other suitable nonmetallic material (see FIG. 7), and a sealing ring assembly 132. This sealing ring assembly 132, which is shown in cross section in FIG. 8, is seen to comprise an inner elastomeric O-ring 133, a centrally-positioned metal ring 134 and an outer elastomeric O-ring 135. This is identical to the sealing ring assembly which is employed in the valve seal.

A metal packing ring 138 (FIG. 4) is placed on the uppermost leather washer, and the entire assembly is completed and held in place by means of the two nuts 139 and 140.

Figure 9:
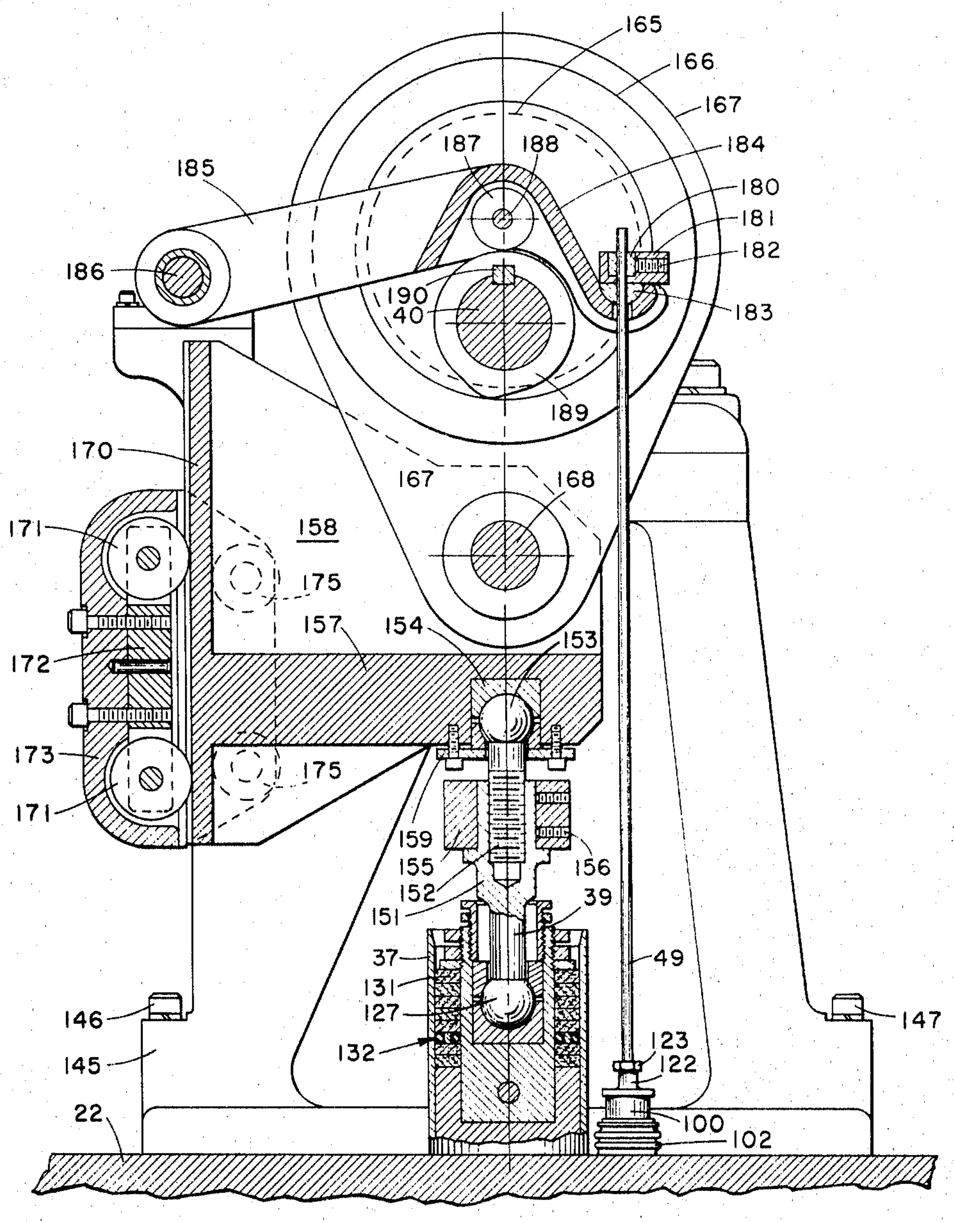
FIG. 9 is a detailed side elevational view, partly in cross section, of the driving mechanisem.

FIG. 9 is a side elevational view, partly in cross section, of the cross-head and driving means used to actuate the piston and the valve assemblies. It will, of course, be appreciated that there is a separate valve rod drive for each of the valves and a separate driving mechanism for each of the expansion engines within any apparatus. In this figure like numerals refer to identical components shown in th preceding figures.

A driving mechanism support 145 is mounted on the housing member 22 through suitable devices such as screws 146 and 147. The piston rod 39 is integral with a lower ball-joint connection piece 151 which is attached through means of a screw 152 to an upper ball joint 153. This upper ball joint is mounted in a suitable ball-joint race 154, and the assembly is held in place through the use of a collar 155 and set screws 156. The upper ball joint 153 is mounted on a horizontal flange 157 of a bearing track piece 158 through the use of a suitably designed retaining plate 159.

The piston rod is driven by an eccentric 165, mounted in an eccentric bearing 166, through connecting plate 167 which is pivotally attached to bearing track piece 158 (and hence to horizontal flange 157) through an auxiliary shaft 168. FIG. 9 does not show it, but the eccentric is driven off of main crankshaft 40. In order to impart true vertical motion to the piston, the bearing track piece 158 operates through a vertical plate 170 between outer bearings 171 and inner bearings 175. The outer beairngs, in turn, have associated with them a suitable bearing guide 172 and a housing 173.

The valve rods are also driven off main crankshaft 40, as is illustrated in FIG. 9. To the upper end of valve rod 49 there is affixed a valve rod clamp 180 in a housing 181 and through the use of a set screw 182. This assembly, in turn, rests upon a valve rod bushing 183, which is in contact with a bushing support 184. This bushing support is, in turn, made integral with a rocker arm 185 pivotally mounted on a support shaft 186. The rocker arm has a cam follower 187 rotatably affixed to the rocker arm through shaft 188. The cam follower, in turn, engages the outer surface of valve rod drive cam 189 which is attached to main shaft 40 through a key 190.

Figure 10:
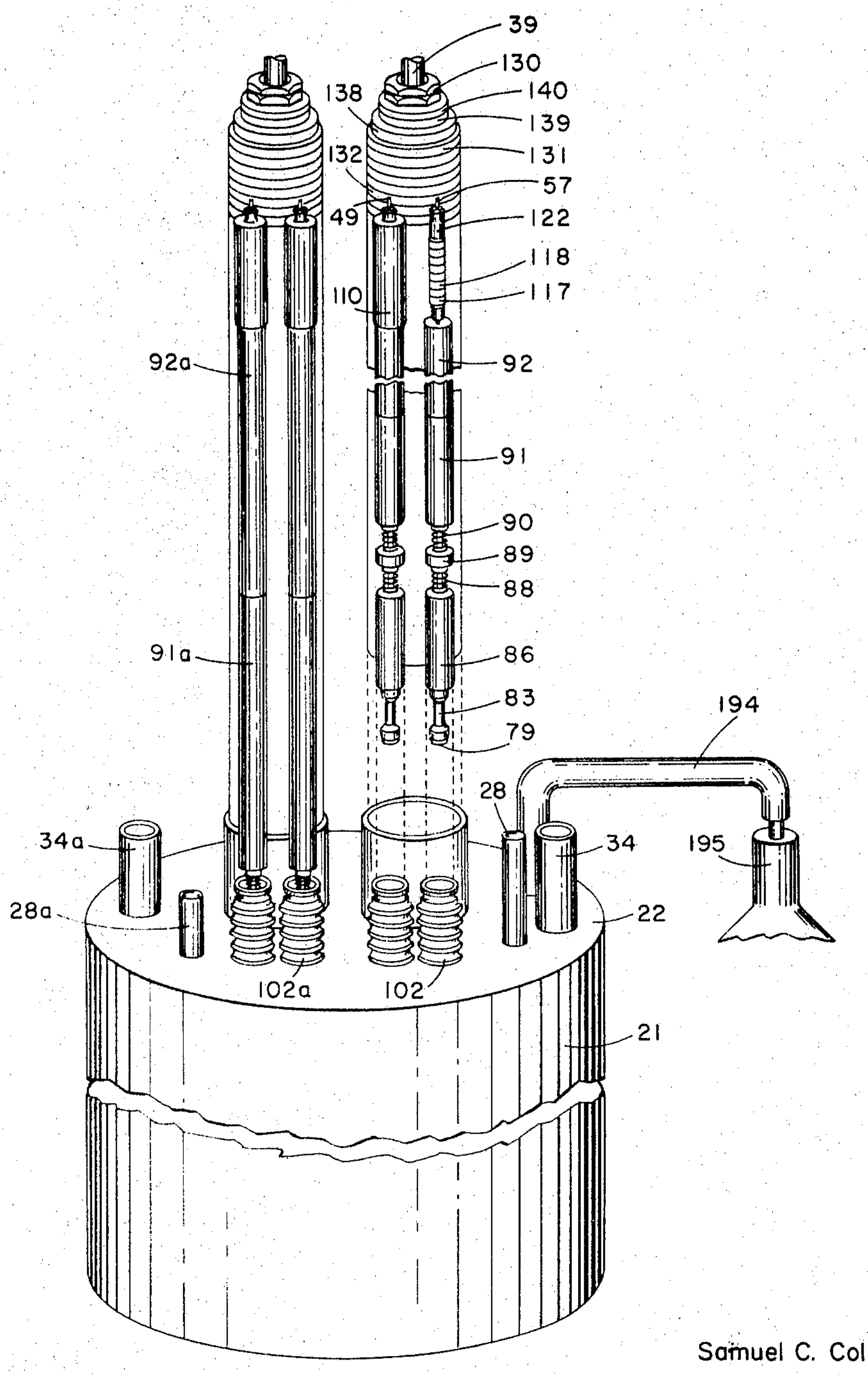
FIG. 10 is a side elevational view of the apparatus of this invention showing the withdrawal of two expansion engines.

FIG. 10 illustrates the manner in which the expansion engines of this invention can be readily withdrawn from the apparatus. An examination of FIGS. 3 and 4 will show that such withdrawal of the expansion piston and the valve assembly does not affect the condition of the atmosphere within volume 25 of the hermetically-sealed housing. This is due to the fact that the valve cylinders 47 and 55, along with the piston cylinder 37, terminate within the valve plate 65 and are in direct communication with the fluid flow path of the heat exchangers. There is no fluid communication between this side of the apparatus and the external volume of the housing. In FIG. 10 the apparatus illustrated contains two expansion engines at different levels and therefore of different lengths. The expansion engine on the left represents that which operates at a colder level, as will become apparent from the discussion of FIGS. 12, 14 and 15 which follow. The lower-case letter *a* has been added to the reference numerals for the lower-temperature expansion engine since all of the components are identical to those of the higher-temperature engine. The reference numerals are those which have been used for identical parts in FIGS. 3–9. FIG. 10 also illustrates a draw-off tube 194 which leads directly into a liquid storage vessel shown in part as 195. This draw-off tube is conveniently a remote delivery tube containing at its delivery end a Joule-Thomson expansion valve. This remote delivery tube is described in detail in U.S. Patent 3,201,947.

The manner in which the expansion engines may be readily withdrawn, as shown in FIG. 10, will be apparent from an examination of FIG. 9. It is only necessary to unscrew and remove screws 146 and 147 and take out the snaprings 111 (FIG. 4) which hold the annular packing cylinders 110 in place in the valve assembly. It is then possible to raise the entire driving mechanism support directly above the apparatus. This lifts with it the piston and valve rod assemblies. In the case of the piston, it is completely withdrawn along with the seal assembly, as illustrated in FIG. 4. In the case of the valves, the entire valve rod assembly extending from the closing piece 79 through the spacer means 91 and 92 and the annular packing cylinder 110 is pulled out. If desired, the piston and valve assembly may then be disengaged from the driving mechanism support by releasing the valve rod clamps 180 and the retaining plate 159 of the piston assembly.

The reinsertion of the piston and valve rod assemblies is accomplished by merely inserting them into their respective cylinders. The valve rod clamps and snaprings 111 are put in place and the retaining plate 159 is screwed into position. Because of the structure of these assemblies, no special attention need be given to the attainment of proper alignment since this will be automatic.

The expansion engines of this invention are suitable for incorporating into a number of different refrigerator and liquefying apparatus. As illustrative of this fact, refrigerator and liquefier apparatus are presented in schematic form. The expansion engines which are illustrated schematically in accordance with accepted procedure in FIGS. 11–15 are those which are shown in detail in FIGS. 3–9.

Figures 11, 12, 13:
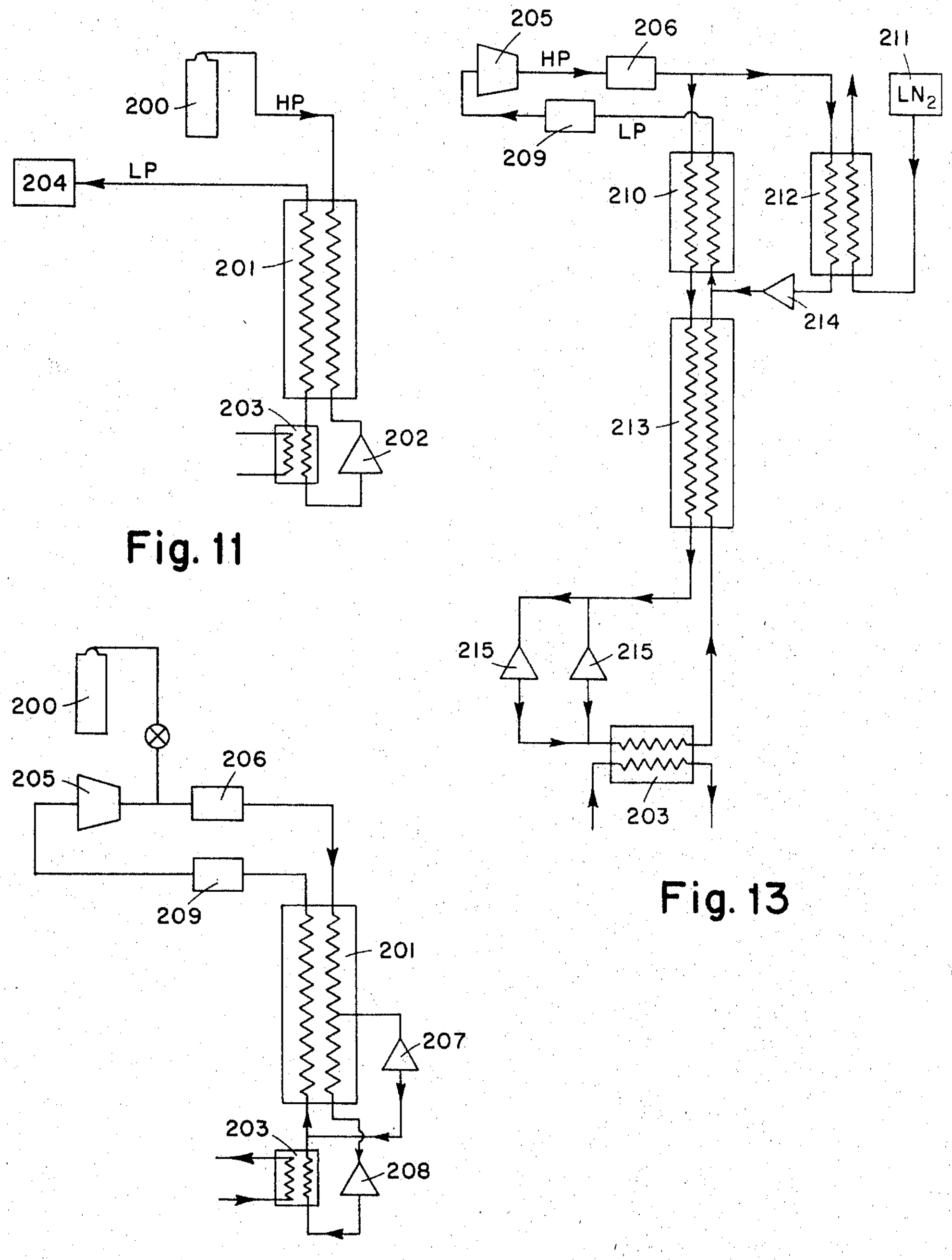
FIGS. 11–13 are schematic diagrams of three embodiments of cryogenic refrigerators incorporating one or more of the expansion engines of this invention.

FIGS. 11–13 represent refrigerators, and it is believed that no detailed description need be given except to identify the basic components making up the apparatus. FIG. 11 illustrates an open cycle apparatus in which a high-pressure cryogenic fluid is supplied from a source 200 to the high-pressure side of a main, out-of-contact heat exchanger 201. The initially-cooled fluid is then expanded and further cooled in an expansion engine 202 and after supplying refrigeration to a load 203 is returned through the low-pressure side of heat exchanger 201 to effect the initial cooling of the high-pressure fluid.

FIG. 12 shows a closed cycle incorporating a compressor 205, and its associated aftercooler 206, which supplies high-pressure fluid to the main heat exchanger 201. This apparatus employs two expansion engines 207 and 208, the former being supplied with high-pressure fluid withdrawn from an intermediate point of the heat exchanger. A clean-up system 209 is indicated, and any makeup high-pressure fluid may be supplied from a high-pressure fluid source 200.

The refrigerator of FIG. 13 employs two heat exchangers 210 and 213 and derives some precooling of a portion of the high-pressure fluid from liquid nitrogen (from source 211) by using a precooling out-of-contact heat exchanger 212 which returns cold, low-pressure fluid from an expansion engine 214 to the low-pressure side of heat exchanger 210. Two expansion engines 215 are employed in parallel as contrasted with the series arrangement of FIG. 12.

Figure 14:
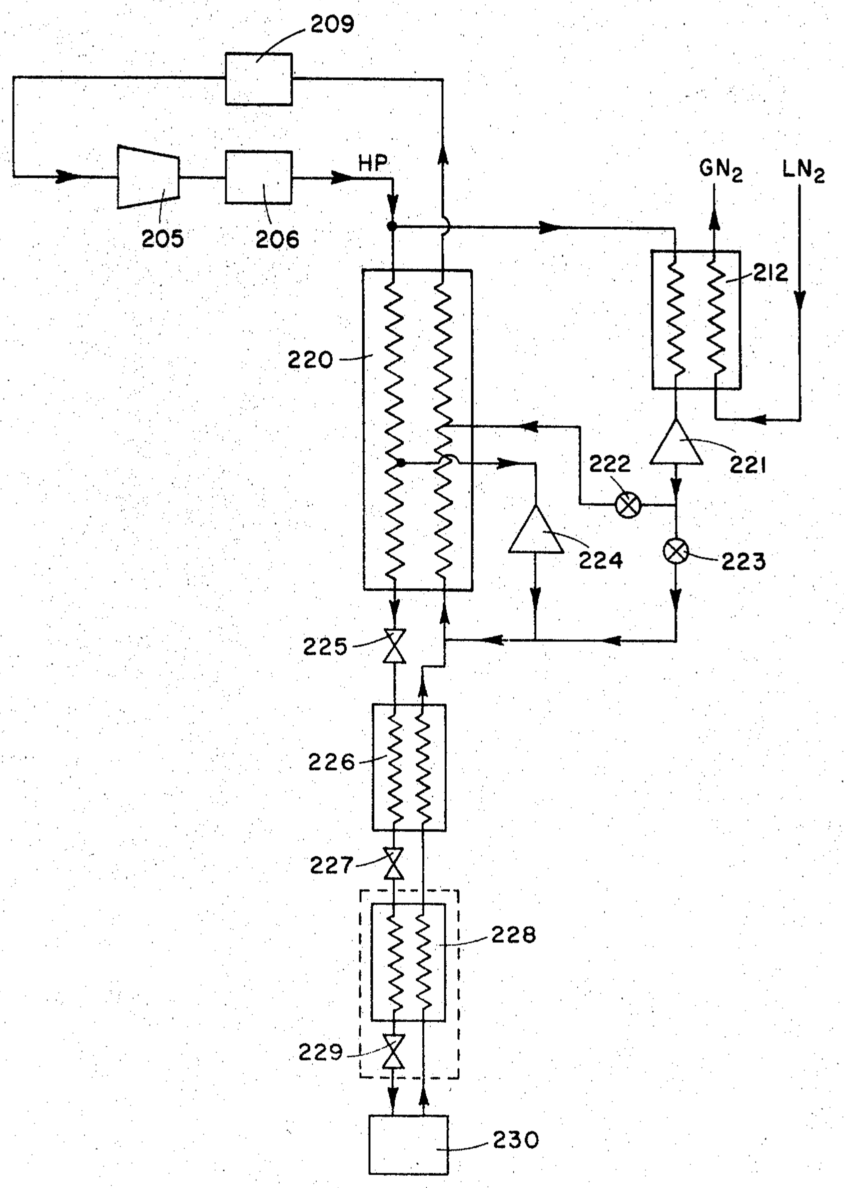
FIGS. 14 and 15 are schematic diagrams showing two embodiments of helium liquefiers incorporating the expansion engines of this invention.

FIG. 14 represents a cryogenic apparatus capable of liquefying helium. A portion of the high-pressure fluid is introduced into the main out-of-contact heat exchanger 220, while a second portion is directed through a liquid nitrogen precooling heat exchanger 212. The precooled fluid is then expanded in expansion engine 221 and returned to the low-pressure side of heat exchanger 220 at an intermediate point. A part of the initially cooled high-pressure fluid is withdrawn from the high-pressure side of the heat exchanger 220 and introduced into expansion engine 224, the cold, low-pressure fluid in this engine returning into the bottom end of the heat exchanger 220. A bypass line is incorporated into this cycle along with two valves 222 and 223. During cooldown valve 222 is closed and 223 opened to effect more rapid cooling of the system. During normal operation, valve 223 is closed and 222 open. A first Joule-Thomson expansion valve 225 is placed in the high-pressure fluid line prior to its passing through the first Joule-Thomson heat exchanger 226. A second Joule-Thomson valve is placed intermediate between Joule-Thomson heat exchangers 226 and 228, and a third Joule-Thomson valve follows Joule-Thomson heat exchanger 228. The Joule-Thomson heat exchanger 228 and valve 229 may comprise a remote delivery tube as described in U.S. Patent 3,201,947. The liquefied helium is accumulated in a suitable storage vessel such as a dewar 230.

Figure 15:
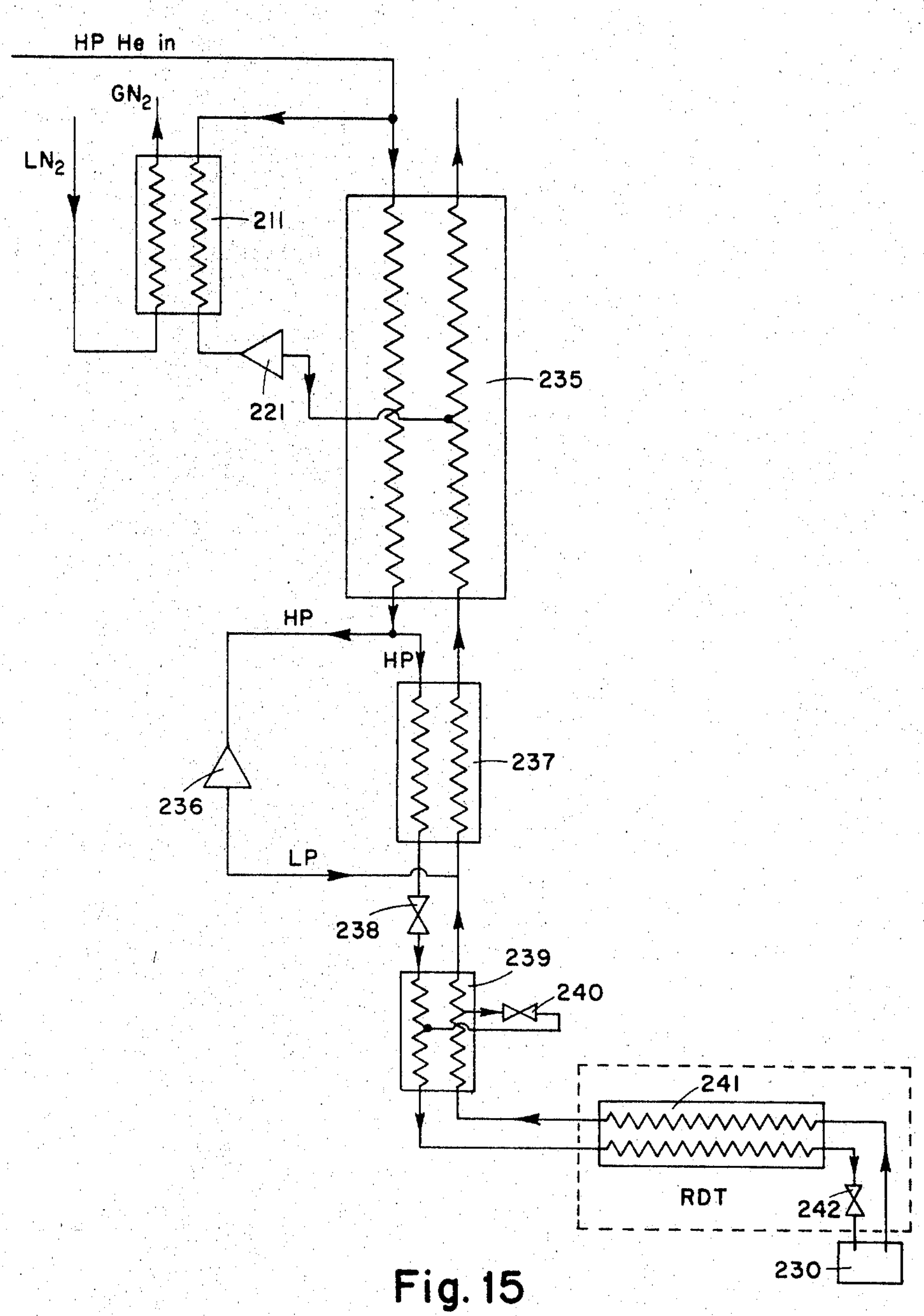

Finally, FIG. 15 illustrates another liquefaction cycle which is particularly well suited for the employment of the expansion engines of this invention. Liquid nitrogen precooling is employed as in the liquefier of FIG. 14; and the expanded, cooled helium is returned at an intermediate point within the main, out-of-contact heat exchanger 235. A second expansion engine works on high-pressure, initially-cooled helium withdrawn from the lower part of the main heat exchanger; and the resulting cold, expanded fluid is returned through a second auxiliary heat exchanger 237 to cool the other portion of the high-pressure fluid delivered from the main heat exchanger 235. A series of Joule-Thomson valves are provided. Joule-Thomson valve 238 precedes Joule-Thomson heat exchanger 239, while Joule-Thomson valve 240 is used in conjunction with heat exchanger 239. Finally, Joule-Thomson valve 242 follows the final Joule-Thomson exchanger 241. As in the case of the apparatus of FIG. 14, the heat exchanger 241 and Joule-Thomson expansion valve 242 may comprise a remote delivery tube which is inserted into a suitable liquid helium storage means 230.

It will be apparent from the brief discussion of the various refrigeration cycles and liquefiers illustrated in FIGS. 11–15 that the expansion engines of this invention are versatile in their application to many different types of apparatus, several of which are illustrated. The expansion engines are easily constructed and their maintenance is simple and readily achieved. It will be apparent that from the description presented that the expansion engines may be serviced by other than a skilled technician. Since the remaining portion of any apparatus into which the expansion engines are incorporated need not be disturbed for maintenance, the time required to tend the apparatus incorporating the expansion engine is minimal. The engines, of course, may be made in a wide range of sizes and incorporated in miniature to large scale equipment.

It will thus be seen that the objects set forth above, among those made apparent from the preceding description, are efficiently attained and since certain changes may be made in the above constructions, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. Cryogenic apparatus including heat exchange means adapted to effect indirect heat exchange between fluid streams of high and low pressure; fluid flow path means, including conduit means adapted to conduct high-pressure and low-pressure fluid through said heat exchange means; one or more fluid expansion means associated with said flow path means and adapted to expand high-pressure fluid and effect the cooling thereof; and an insulated hermetically sealed housing means equipped with a cover member thereby defining an insulated chamber containing said heat exchange means, said fluid flow path means, and said fluid expansion means, and having external conduit means extending through said cover member and in fluid communication with said fluid flow path means, said apparatus being characterized in that at least one of said fluid expansion means comprises, in combination (a) a piston cylinder extending externally of said housing through said cover member;

(b) piston means movable within said piston cylinder, defining therein an expansion chamber of variable volume, and having piston sealing means maintained at essentially ambient temperature extending externally of said housing adapted to effect a fluid-tight seal between said piston and the internal wall of said piston cylinder;

(c) an inlet valve providing a controllable fluid conduit between a high-pressure portion of said fluid flow path means and said expansion chamber, and an exhaust valve providing a controllable fluid conduit between a low-pressure portion of said fluid flow path means and said expansion chamber, each of said valves comprising, in combination (1) a valve cylinder in fluid communication with said flow path means, extending externally of said housing through said cover member and being adapted to move vertically in expansion and contraction with changing temperature, (2) a fluid conduit between said expansion chamber and said valve cylinder and terminating within said cylinder in a valve seat, (3) a vertically movable valve rod assembly terminating at its lower end in a closing member adapted to engage said valve seat, said valve rod assembly having sealing means extending at least in part externally of said housing and being adapted to effect a fluid-tight seal between it and said valve cylinder, said sealing means being exposed to ambient conditions; and (d) controlling means external of said housing mechanically connected to said piston and said valve rod assembly adapted to control the movement of said piston and actuate said valve means in a predetermined sequence.

2. Cryogenic apparatus in accordance with claim 1 wherein said piston sealing means and said valve rod assembly sealing means are characterized as comprising, in combination (1) a plurality of nonmetallic washers, and (2) a sealing washer assembly positioned between two of said nonmetallic washers and comprising an inner elastomeric ring, a central metallic ring and an outer elastomeric ring.

3. Cryogenic apparatus in accordance with claim 2 wherein said nonmetallic washers are leather impregnated with a small amount of lubricant.

4. Cryogenic apparatus in accordance with claim 1 wherein the upper end of said piston means defines with the internal wall of said piston cylinder an annular space in which said piston sealing means are located; and said piston sealing means comprises, in combination (1) a plurality of nonmetallic washers, and (2) a washer assembly positioned between two of said nonmetallic washers and comprising an inner elastomeric ring, a central metallic ring and an outer elastomeric ring.

5. Cryogenic apparatus in accordance with claim 1 wherein said cylindrical tubing is attached to said cover member through a bellows member thereby adapting it to move vertically in expansion and contraction.

6. Cryogenic apparatus in accordance with claim 1 wherein said valve rod assembly comprises, in combination (1) a valve stem, (2) said closing member affixed to the lower end of said valve stem, (3) a contoured sleeve defining an annular fluid passage with the internal wall of said valve cylinder, (4) a valve rod guide, (5) spring means adapted to apply a force on said closing member in opposition to that force which disengages said closing member from said valve seat, (6) means including spacer means for supporting said spring means, (7) sealing assembly means, and (8) an annular packing cylinder making a fluid-tight seal with the upper end of said valve cylinder and defining with said valve stem an annular spacing for said sealing assembly means.

7. Cryogenic apparatus in accordance with claim 6 wherein said sealing assembly means comprises, in combination (1) a plurality of nonmetallic washers, and (2) a washer assembly positioned between two of said nonmetallic washers and comprising an inner elastomeric ring, a central metallic ring and an outer elastomeric ring.

8. Cryogenic apparatus in accordance with claim 6 wherein said closing member is leather and said spacer members are Micarta.

9. Cryogenic apparatus in accordance with claim 1 wherein said controlling means includes a main drive shaft rotatably mounted on a drive support and means associated with said main drive shaft to impart vertical motion to said piston means and said valve rod means, said drive support being detachably mounted on said cover member whereby it may be raised thereabove to withdraw support being detachably mounted on said cover memsaid piston means and said valve rod means from said cryogenic apparatus without breaking the hermetical seal of said housing.

10. A cryogenic apparatus comprising in combination
(a) a source of high-pressure fluid;
(b) heat exchange means adapted to effect indirect heat exchange between fluid streams of high and low pressure;
(c) conduit means connecting said source of high-pressure fluid to the high-pressure side of said heat exchange means and the low-pressure side of said heat exchange means to a low-pressure region;
(d) one or more fluid flow path means, including conduit means adapted to conduit high-pressure and low-pressure fluid through said heat exchanger means;
(e) fluid expansion means associated with said flow path means and adapted to expand high-pressure fluid and effect the cooling thereof; and
(f) insulated hermetically sealed housing means equipped with a cover member thereby defining an insulated chamber containing said heat exchange means, said fluid flow path means, and said fluid expansion means, and having said conduit means extending through said cover member and in fluid communication with said fluid flow path means, said apparatus being characterized in that said fluid expansion means comprises, in combination
(1) a piston cylinder extending externally of said housing through said cover member,
(2) piston means movable within said piston cylinder, defining therein an expansion chamber of variable volume, and having piston sealing means maintained at essentially ambient temperature extending externally of said housing adapted to effect a fluid-tight seal between said piston and the internal wall of said piston cylinder,
(3) an inlet valve providing a controllable fluid conduit between a high-pressure portion of said fluid flow path means and said expansion chamber, and an exhaust valve providing a controllable fluid conduit between a low-pressure portion of said fluid flow path means and said expansion chamber, each of said valves comprising, in combination
(1) a valve cylinder in fluid communication with said flow path means, extending externally of said housing through said cover member and being adapted to move vertically in expansion and contraction with changing temperature,
(2) a fluid conduit between said expansion chamber and said valve cylinder and terminating within said cylinder in a valve seat,
(3) a vertically movable rod assembly terminating at its lower end in a closing member adapted to engage said valve seat, said valve rod assembly having sealing means extending at least in part externally of said housing and being adapted to effect a fluid-tight seal between it and said valve cylinder, said sealing means being exposed to ambient conditions, and (g) controlling means external of said housing mechanically connected to said piston, and said valve rod assembly adapted to control the movement of said piston and actuate said valve means in a predetermined sequence.

11. A cryogenic apparatus in accordance with claim 10 wherein said piston sealing means and said valve rod assembly sealing means are characterized as comprising in combination
(1) a plurality of nonmetallic washers, and
(2) a sealing washer assembly positioned between two of said nonmetallic washers and comprising an inner elastomeric ring, a central metallic ring and an outer elastomeric ring.

12. A cryogenic apparatus in accordance with claim 11 wherein said nonmetallic washers are leather impregnated with a small amount of lubricant.

13. A cryogenic apparatus in accordance with claim 11 wherein said source of high-pressure fluid comprises fluid compressor means and associated aftercooler means.

14. A cryogenic apparatus in accordance with claim 10 wherein there are two separate fluid expansion means arranged in thermal series, the first of which is in fluid communication with said high-pressure side of said heat exchange means at an intermediate temperature level and the second of which is in fluid communication with said high-pressure side of said heat exchange means at essentially the coldest level.

15. A cryogenic apparatus in accordance with claim 10 further characterized by having precooling heat exchange means adapted to cool a portion of said high-pressure fluid prior to expansion.

16. A cryogenic apparatus in accordance with claim 10 wherein there are two separate fluid expansion means arranged in thermal parallel whereby each receives a portion of initially cooled high-pressure fluid from said heat exchange means.

References Cited

UNITED STATES PATENTS

| | | | |
|---|---|---|---|
| 2,113,680 | 4/1938 | De Baufee | 62—38 XR |
| 2,607,322 | 8/1952 | Collins | 91—273 XR |
| 2,895,303 | 7/1959 | Streeter. | |
| 3,131,547 | 5/1964 | Collins | 62—38 XR |
| 3,201,947 | 8/1965 | Post et al. | 62—514 XR |
| 3,360,955 | 1/1968 | Witter. | |

NORMAN YUDKOFF, *Primary Examiner.*

V. W. PRETKA, *Assistant Examiner.*

U.S. Cl. X.R.

23—253, 260; 137—4, 467.5; 260—505, 686, 698